July 22, 1930.  A. E. PAYSON  1,770,944

REFRIGERATING RECEPTACLE

Filed May 15, 1928

INVENTOR
Aurin E. Payson
BY
Adolph R. Thomas
ATTORNEY

Patented July 22, 1930

1,770,944

UNITED STATES PATENT OFFICE

AURIN E. PAYSON, OF NORWICH, CONNECTICUT

REFRIGERATING RECEPTACLE

Application filed May 15, 1928. Serial No. 277,825.

My invention relates to the art of refrigeration, and its object is to provide a heat-insulated receptacle containing an annular holder for dry ice or like refrigerant. This holder is preferably in the form of a trough-shaped collar adapted to be inserted into the jar where it is supported by an inner shoulder. The collar is shaped to contain a quantity of dry ice which escapes in the form of gas to the interior of the jar, where the gas expands amid lowering of temperature. The construction and mounting of the collar are such that it is entirely out of the way in removing the contents of the jar, which is supposed to contain eatables requiring low temperature, such as ice cream and other confections.

Figure 1:
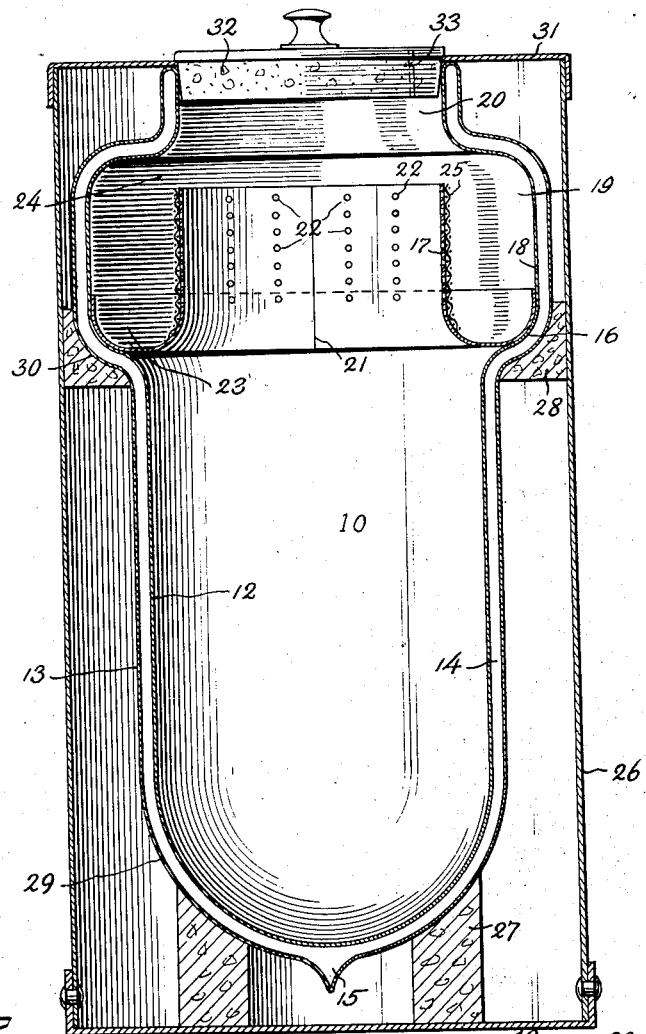
Figure 2:
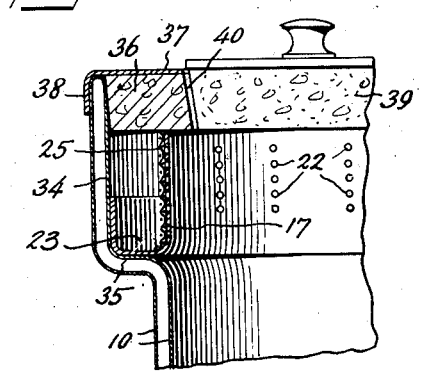
Figure 3:
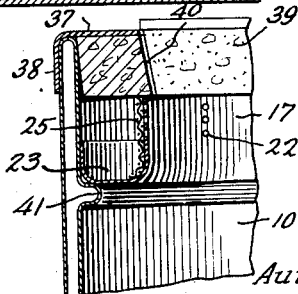

The practical advantages of my new refrigerating receptacle will be understood from a detailed description of several embodiments of my invention as illustrated in the accompanying drawings, in which Fig. 1 shows a cross-section of a double-walled vacuum jar constructed in accordance with my invention; and Figs. 2 and 3 are fragmentary sectional views of two modifications in which the neck of the jar is not drawn in as in Fig. 1.

Referring to Fig. 1, there is a jar 10 of the double-walled vacuum type comprising an inner container 12 and an outer container 13. These containers are usually made of glass in separate molds and are subsequently assembled into a unitary structure. The annular space 14 between the walls is evacuated through a tubular extension 15, which is then sealed. The jar 10 is formed with an annular shoulder 16 adapted to support a trough-shaped collar 17, which constitutes a container for dry ice or other suitable refrigerant. It is well known that dry ice is solidified carbon dioxide, from which carbon dioxide gas escapes to cool the surrounding space. In this particular construction, the offset portion 18 of the jar provides an annular space or recess 19 for the collar 17, so that the latter is practically flush with the mouth 20 of the jar. Since the collar 17 is of greater diameter than the mouth of the jar, it is necessary to contract the collar for insertion into the recess 19. For this purpose, the collar 17 is slit radially at 21, whereby it can be folded on itself sufficiently to be inserted into the jar. The enlarged annular space 19 allows the collar to expand to normal size so as to rest firmly on the annular shoulder 16.

The trough-shaped collar 17 is preferably made of sheet metal which permits folding and expansion of the collar for mounting in the jar. The inner circular wall of collar 17 is provided with perforations 22 through which the refrigerating gas escapes. The trough-shaped bottom 23 of the collar holds the residue left by the melting dry ice and prevents it from falling on the goods in the jar. The open space 24 above the collar offers additional escape for the gas and also permits filling of the collar without removal from the jar. If desired, the collar 17 may have a lining 25 of felt or other pervious material to retard the escape of refrigerating gas through the perforations 22.

The refrigerating receptacle 10 is supported in upright position in any practical way. In Fig. 1 I have shown an outer casing 26 provided with a cork ring 27 at the bottom and another cork ring 28 near the top. These two cork rings are so shaped as to engage, respectively, the rounded bottom 29 and the upper shoulder 30 of the jar. The casing 26 has a removable top 31 provided with a central opening in line with the mouth 20 of the jar. A suitable stopper 32, such as a cork disk, fits into the mouth of the jar to close the same. To prevent the undue accumulation of carbon dioxide gas in the jar, the stopper 32 is provided with a vent 33.

In the modified construction of Fig. 2, the jar 10 has an enlarged mouth 34 which forms an annular shoulder 35 for supporting the trough-shaped collar 17. In this instance, the collar need not be split, because it can be inserted through the mouth of the jar without folding. The annular chamber formed by the collar 17 is closed by a cork ring 36, which fits tight in the mouth of the jar. The ring 36 is preferably covered with a sheet metal plate 37 having an annular flange 38 adapted to hook over the rim of the jar. The central aperture of ring 36 is closed by a removable stopper 39, which may simply be a cork disk. A vent 40 in cork disk 36 allows the escape of accumulated gas.

In Fig. 3, the double-walled vacuum jar 10 is formed with an inner bead or shoulder 41 arranged to support the trough-shaped collar 17. Otherwise, the detailed description of Fig. 2 applies to Fig. 3 without the need of repetition. Since the trough-shaped collar 17 in Figs. 2 and 3 need not be folded for insertion in the jar, this collar may be made of any practical material, such as sheet metal, wood pulp, bakelite, fiber, and so forth. The pervious lining 25 need not cover all of the perforations 22, for it may extend only partway around the collar to cover the desired number of openings. In this way, the rate of escape of refrigerating gas can be regulated to obtain the required temperature in the jar. The inner diameter of collar 17 is sufficiently large to permit the insertion of the attendant's hand for withdrawing goods from the jar. In other words, the refrigerant is entirely out of the way in filling and emptying the jar.

Another practical advantage of collar 17 lies in the fact that its trough-shaped bottom retains the residue left after the dry ice has evaporated, so that there is no danger of the confections in the jar being contaminated by drippings from this residue. It is a simple matter to remove the collar, clean out the residue, and load it with a fresh supply of dry ice.

Although I have shown and described certain specific constructions, I want it clearly understood that my invention is not limited to the details set forth. It is to be expected that changed and modifications will occur to those skilled in the art without departing from the scope of my invention as defined in the appended claims.

I claim as my invention:

1. A refrigerating receptacle provided inside with an annular shoulder, and a trough-shaped collar removably supported on said shoulder for holding a supply of dry ice, said collar permitting the escape of refrigerating gas to the interior of the receptacle, the inner wall of said collar being higher than the outer wall.

2. As a new article of manufacture, a double-walled vacuum jar of glass in which the inner and outer walls are bent to form an integral annular shoulder near the mouth of the jar, the annular vacuum space in the jar extending above said shoulder, for the purpose specified.

3. As a new article of manufacture for use in refrigerating receptacles, a trough-shaped collar adapted to hold dry ice, the inner wall of its collar being higher than the outer wall.

4. A refrigerating receptacle provided with an inner shoulder, a trough-shaped perforated collar removably supported on said shoulder for holding dry ice, said collar permitting the insertion of a hand into the receptacle, and a lining for said collar to retard the escape of gas through said perforations.

5. A refrigerating receptacle provided with an inner shoulder, an open trough-shaped collar supported on said shoulder for holding dry ice, means carried by said receptacle to close said collar, which is pervious to the escape of refrigerating gas, and a removable closure for said receptacle.

6. A refrigerating receptacle having a shoulder inside near the top, an annular container supported on said shoulder for holding dry ice, said container being open on top, a heat-insulated ring supported in the mouth of said receptacle and adapted to close said container, which permits the escape of refrigerating gas to the interior of the receptacle, and a removable cover mounted on said ring.

7. A double-walled vacuum jar provided on the inner wall with an integral annular shoulder near the mouth of the jar, an open trough-shaped collar supported on said shoulder for holding dry ice, a heat-insulated ring supported in the mouth of said jar and adapted to close said collar, which permits the escape of refrigerating gas to the interior of the receptacle, and a removable cover mounted on said ring.

8. A double-walled vacuum jar of glass having a main lower section and an enlarged top section, the glass walls of the jar being bent at the junction of the two sections to provide an annular shoulder adapted to support a container for a refrigerant.

9. A double-walled vacuum jar of glass having a main lower section and an enlarged top section, the glass walls of the jar being bent at the junction of the two sections to provide an annular shoulder, an open collar removably supported on said shoulder for holding a supply of a refrigerant, the upper edge of said collar being below the top rim of said jar, and a cover extending into said jar to close said collar.

AURIN E. PAYSON.